United States Patent [19]

May et al.

[11] Patent Number: 4,517,231

[45] Date of Patent: May 14, 1985

[54] HOLLOW ENCLOSED SEAMLESS POLYMERIC ARTICLE CONTAINING A BAFFLE

[75] Inventors: Joseph R. May, Chatham; Frank Petruccelli, Parsippany-Troy Hills; Robert L. Lang, Florham Park; Herman P. de Haan, Chatham, all of N.J.

[73] Assignee: Allied Corporation, Morris Township, Morris County, N.J.

[21] Appl. No.: 416,797

[22] Filed: Sep. 13, 1982

[51] Int. Cl.$^3$ .......................... B32B 1/02; B32B 27/00
[52] U.S. Cl. ........................................ 428/35; 220/22; 264/275; 264/310
[58] Field of Search .......................... 428/35, 911, 60; 264/275, 277, 278, 310; 220/22, 453

[56] References Cited

U.S. PATENT DOCUMENTS

| | | | |
|---|---|---|---|
| 3,258,369 | 6/1966 | Blaich | 220/22 |
| 3,610,457 | 10/1971 | Opalewski | 220/22 |
| 4,143,193 | 3/1979 | Rees | 264/310 |
| 4,350,258 | 9/1982 | Rogers | 220/22 |

Primary Examiner—Paul J. Thibodeau
Attorney, Agent, or Firm—Richard A. Negin; Patrick L. Henry; Richard A. Anderson

[57] ABSTRACT

A hollow, enclosed, seamless polymeric article. The article has an outer wall having an outside surface and an inside surface. There is at least one baffle within the article. There is a means to sealingly connect the baffle to the outer wall inside the article. The means to sealingly connect the baffle can sealingly connect the baffle to the inside surface of the outer wall or through the inner surface into the outer wall.

11 Claims, 8 Drawing Figures

HOLLOW ENCLOSED SEAMLESS POLYMERIC ARTICLE CONTAINING A BAFFLE

BACKGROUND OF THE INVENTION

This invention is in the field of hollow articles; more particularly, the invention relates to an enclosed, seamless polymeric article having an enclosed baffle.

Hollow, enclosed, seamless polymeric articles are known in the art and can be made by several methods. Methods useful to make such articles include blow molding, slush molding, polymer casting, and rotational molding.

Rotational molding, also known as rotomolding, is used in the manufacture of hollow objects from polymeric material. In the basic process of rotational molding, solid or liquid polymers are placed in a mold. The mold is first heated and then cooled while being rotated, usually about two perpendicular axes simultaneously. Many polymers can be used in the rotational molding process. Polymers commonly used in rotational molding include polyolefins such as polyethylene. It is also known to use polycarbonates, crosslinkable polyethylene, nylon, and other materials. In selecting the rotational molding grade formulation, care must be taken to assure that there will not be thermal degradation during the heating cycle. A general discussion on rotational molding is given in MODERN PLASTICS ENCYCLOPEDIA 1979-1980, Volume 56, No. 10A, beginning at Page 381.

In making hollow, enclosed, seamless articles, there is an outer wall enclosing an inner space. Generally, the inner space is devoid of structural features other than those that can be molded in during the molding process. Specific uses require structural features within the enclosed, polymeric articles. A typical use requiring such a structural feature is baffles in tanks containing fluids. Presently, hollow, enclosed tanks which contain fluids have baffles built into them. The baffles are used to prevent the fluids within the tanks from sloshing around the tank uncontrollably. Baffles are built into metal tanks and then the tanks are closed by suitable means such as welding two pieces of the tank together leaving a seam.

Baffles have been molded into hollow, enclosed, seamless polymeric articles. One method to do this has been to hold a screen across the inside of the mold where the baffle is to be located. The screen is held in position by a means to connect it attached to the mold wall. A problem with both the use of the screen within the article to secure metal baffles is that it provides a wicking path through the tank wall, or communication from within the inside of the hollow, enclosed, polymeric article to outside. This wicking effect is undesirable, particularly when using volatile fluids, such as fuel.

SUMMARY OF THE INVENTION

The present invention is a hollow, enclosed, seamless polymeric article. The article has an outer wall having an outside surface and an inside surface. There is at least one baffle within the article. There is a means to sealingly connect the baffle to the outer wall inside the article. The means to sealingly connect the baffle can sealingly connect the baffle to the inside surface of the outer wall or through the inner surface into the outer wall.

A means to sealingly connect the baffle to the inside surface of the outer wall is a rod containing a longitudinal slot to receive the baffle. At least one rod is made of a polymeric material compatible with the polymeric material of the outer wall. The rod is connected to the inner surface of the outer wall of the article at a rod seat corresponding to the shape of the rod. The baffle is slidably mounted in the slots in the rods.

In an alternate embodiment, the means to sealingly connect the baffle is at least one slotted pin to receive the baffle. The slotted pin is molded into the outer wall through the inner surface of the outer wall. A sealing plug is sealingly located between the outside surface of the outer wall and the slotted pin. The plug is made of a polymeric material compatible with the polymeric material of the outer wall of the article.

In yet another embodiment, the slotted pin is made of a polymeric material compatible with the polymeric material of the outer wall. The slotted pin is molded to the outer wall. The surface of the slotted pin in contact with the outer wall is made of the polymeric material which is preferably beveled.

The present invention includes a process for forming a hollow polymeric article having an outer wall, at least one baffle and a means to sealingly connect the baffle to the outer wall inside of the article. In the process a means to sealingly connect the baffle to the inner mold wall is secured to the inner mold wall. The means to sealingly connect the baffle is connected to the baffle. A polymeric outer layer is rotationally molded adjacent to the mold wall and the interface of the means to sealingly connect the baffle to the mold wall. Preferably, the means to sealingly connect the baffle is sealingly connected to the polymeric layer. This process is particularly preferred where the means to sealingly connect the baffle to the outer wall is itself a polymeric connector, such as a slotted pin or a slotted elongated rod.

Where at least a part of the means to connect the baffle is made of a polymeric material compatible with the polymeric layer, the step of sealingly connecting further comprises fusing the polymer layer to the polymeric part of the means to connect the baffle.

DESCRIPTION OF THE PREFERRED EMBODIMENTS

The present invention is a hollow, enclosed, seamless polymeric article having an outer wall which has an outside surface and an inside surface. There is at least one baffle and the means to sealingly connect the baffle to the outer wall inside of the article. The means to sealingly connect the baffle to the outer wall inside of the article can connect the baffle to the inside surface of the outer wall or alternately through the inner surface into the outer wall. For the purposes of the present invention, the term sealingly connect means that the means to connect the baffle to the outer wall is connected to the outer wall with the article being sealed so that there is no path by which liquids or gases inside of the article can communicate or wick to outside of the article or vice versa at the location of the connection. The outside surface of the outer wall is sealed from the inside of the article. Preferably, the outside surface is seamless and continuous at the point where the means to sealingly connect the baffle is located.

The present invention includes a process for forming a hollow, polymeric article having an outer wall, at least one baffle, and a means to sealingly connect the baffle to or through the outer wall inside of the article. The process is conducted in a mold having an inner mold wall. The means to sealingly connect the baffle to the outer wall is connected to the baffle. This can be done by preassembling the baffle and the means to sealingly connect the baffle and inserting the assembly into the mold where the means to sealingly connect the baffle are secured to the inner mold wall. Alternately, some or all of the means to connect the baffle can be connected to the mold wall and then connected to the baffle. The article can then be formed by rotationally molding a polymeric layer adjacent to the mold wall and the interface of the means to sealingly connect the baffle and the mold wall. The process can have an additional step of sealingly connecting the means to sealingly connect the baffle with the polymeric layer.

The article and process of the present invention will be understood by those skilled in the art by reference to FIGS. 1-8. These figures illustrate the prior art as well as several embodiments of the present invention.

The present invention is a hollow, enclosed, seamless polymeric article having an outer wall having an outside surface and an inside surface. There is at least one baffle. There is a means to sealingly connect the baffle to the outer wall inside the article. In a preferred embodiment, exemplified by FIGS. 1, 2 and 3, the means to sealingly connect the baffle sealingly connects the baffle to the inside surface of the outer wall.

Figure 1:
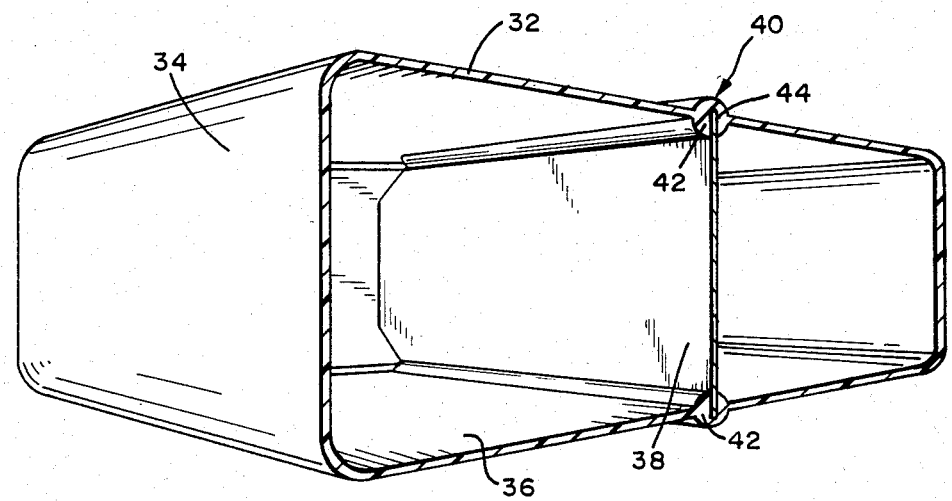
FIG. 1 is a sectional view in perspective of a hollow, enclosed tank containing a baffle where the means to sealingly connect the baffle to the wall of the tank is a slotted polymeric rod.
Figure 2:
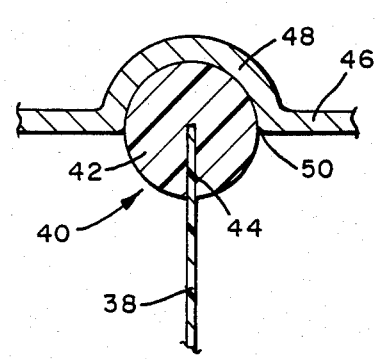
FIG. 2 is a sectional schematic of the polymeric rod securing the baffle in the mold prior to molding.
Figure 3:
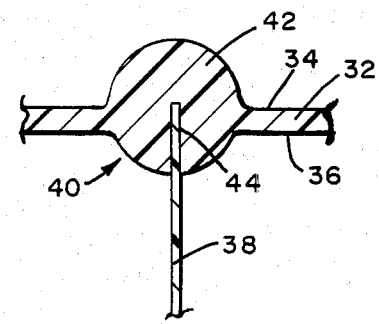
FIG. 3 is a sectional view of the baffle secured by the polymeric rod in the molded article.

The preferred embodiment can be understood by reference to FIGS. 1, 2 and 3. FIG. 1 shows a sectional view of a hollow, enclosed, seamless polymeric article having an outer wall 32. The outer wall has an outside surface 34 and an inside surface 36. There is at least one baffle 38. There is a means to sealingly connect the baffle to outer wall 32. The means to sealingly connect the baffle is generally shown by reference character 40. The means to sealingly connect the baffle sealingly connects the baffle to the inside surface 36 of the outer wall 32.

In the embodiment shown in FIGS. 1, 2 and 3, the means to sealingly connect the baffle is at least one rod 42 having a longitudinal slot 44. The slot 44 has a width equal to or greater than the width of the baffle. The rod 42 is made of a polymeric material compatible with the polymeric material of which the outer wall 32 is made. The edge of the baffle is inserted into the slot 44. Preferably, the mold wall 46 has a rod seat 48 having a shape corresponding to the rod 42. The outer wall 32 correspondingly forms a semicircular groove in which the rod sits. In alternate embodiments the rod can be seated between protrusions to be molded into the mold wall and directed inside of the article. Examples include sets of pairs of bumps, such as domes between which the rod can sit. Alternately, there can be sets of parallel ridges in which the rod can sit.

In the preferred embodiment, the rod 42 is an elongated cylinder having a slot which fits against the straight edge of a baffle 38. The rod and baffle assembly fit into a rod seat 48 in mold wall 46 as shown in FIG. 1. The rod is preferably cylindrical with the rod seat 48 being a circular groove in mold wall 46. There can be at least one means to sealingly connect the baffle 38, such as rod 42. In FIG. 1 there are two rods 42 at opposite sides of the baffle. There can be as many rods as necessary. It is recognized that the rods need not be cylindrical but can be any suitable cross-sectional configuration having a means to hold the baffle, such as a slot 44. Additionally, it is recognized that the rods need not be linear but can have a configuration which conforms to the inner surface shape of the outer wall 32 of the article containing the baffle 38. For example, the rod can be circular holding a circular baffle or can be any other suitable geometric shape, such as a polygon or curving shapes.

The hollow, enclosed, seamless polymeric article containing a baffle as shown in FIG. 1 is made in accordance with the process of the present invention. Generally, the process comprises the steps of securing the means to sealingly connect the baffle to the inner mold wall. The means to sealingly connect the baffle to the outer wall is connected to the baffle. This can be done prior to inserting the baffle into the mold or the baffle can be inserted into the means to sealingly connect the baffle already located in the mold wall. Once the baffle is secured in place, the article is rotationally molded to form a polymeric layer adjacent to the mold wall and the interface of the means to sealingly connect the baffle and the mold wall.

More specifically, the embodiment shown in FIG. 1 can be made with reference to FIGS. 2 and 3. Each edge of baffle 38, which is to be sealingly connected to outer wall 32, is inserted to the longitudinal slot 44 of corresponding rod 42. The assembly of the baffle 38 and rod 32 is inserted into mold 46 at locations such that each rod 42 sits in each rod seat 48. A polymeric layer is then rotationally molded adjacent to the mold wall 46 and the interface 50 between mold wall 46 and rod 42. Methods of rotational molding are discussed below.

Figure 4:
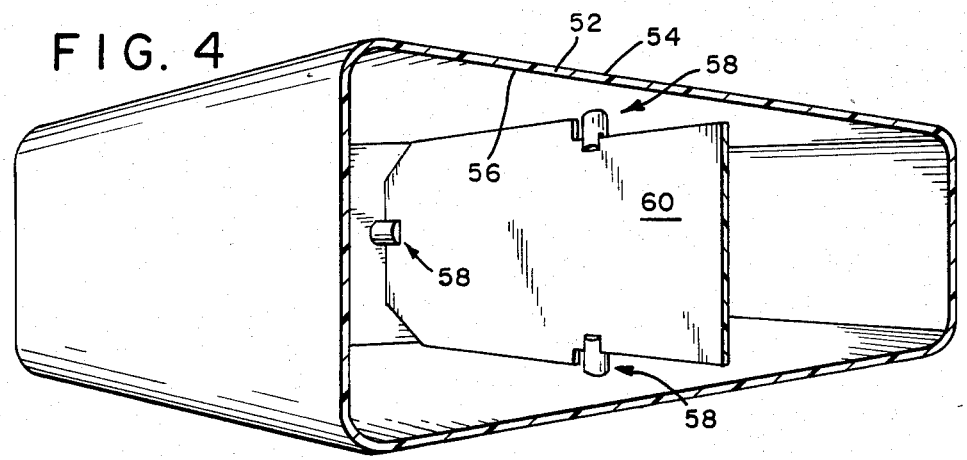
FIG. 4 is a sectional view in perspective of a hollow, enclosed tank having a baffle connected by slotted pins.

FIG. 4 illustrates an alternate embodiment of the present invention. FIG. 4 shows an assembled sectional view of a hollow, enclosed, seamless polymeric article. The article has an outer wall 52 having an outside surface 54 and an inside surface 56. There is a means to sealingly connect the baffle 58 to the outer wall 52. The means to sealingly connect the baffle in this embodiment is an example of sealingly connecting the baffle through the inner surface 56 of the outer wall 52. Specifically, the means to secure 58 is shown as a plurality of slotted pins.

Figure 5:
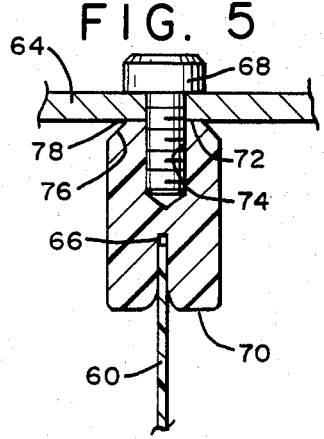
FIG. 5 is a sectional, schematic view of a polymeric slotted polymeric pin holding a baffle in place in a mold prior to molding.
Figure 6:
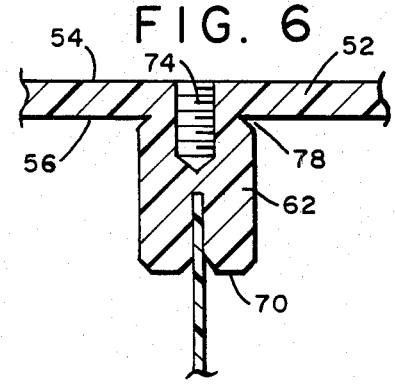
FIG. 6 is a sectional, schematic view of the slotted polymeric pin sealingly connected to the article wall and slidably securing the baffle in place after molding.

There can be a plurality of slotted pins 62 disposed between the baffle 62 and the outer wall 52 to hold the baffle 62 securely in place during molding and after molding. And in the embodiment shown in FIG. 4, the article is a rectangular solid containing a baffle which is secured at opposite edges of the baffle to the outer wall 52. The slotted pins are preferably cylindrical having a slotted end 70 and a secured end 72, as illustrated in FIGS. 4, 5, and 6. In alternate embodiments the slotted pin can be any desirable cross-sectional shape. For example, the slotted pins may be broad to give support over a greater length of the baffle edge.

Preferably, there are a plurality of slotted pins with the slots being coplanar to receive the planar baffle. The baffle and slotted pins can be assembled prior to insertion of the baffle into the mold, or some or all of the slotted pins can be preinserted into the mold and the baffle secured in place with the remaining pins put in after the baffle is secure. Once the slotted pins are holding the baffle in place, the mold can be closed and sealed for molding.

In FIG. 5 the baffle 60 is secured to outer wall 52 by a plurality of polymeric pins 62. FIG. 5 shows a detailed drawing of the polymeric pin securing baffle 60 to mold 64. More particularly, pin 62 contains a slot 66 to receive baffle 60. The pin is connected to the mold by a suitable connecting means such as screw 68. In this way the baffle 60 is secured within the mold 64 by the assembly of screw 68 and pin 62 prior to molding. A preferred pin shape is a cylindrical pin having a slot to receive the baffle at a slotted end 70; and the opposite end is a secured end 72. The secured end 72 can have a threaded hole 74.

In this embodiment the slotted polymeric pin is the means to sealingly connect the baffle. The secured end 72 is secured to the mold 64 by suitable means such as screw 68. Upon molding the article, the upper portion of the polymeric pin 72, which is made of a polymeric material compatible with the outer wall 52, fuses to form a continuous homogeneous outer layer 52 as shown in FIG. 6.

Preferably, the secured end 72 has a beveled edge 76. The outer wall contact surface of the secured end 72 has a bevel to assure a minimum loss of heat to the cool pin at the point where the molten outer layer fuses with the pin. It has been found that if bevel 76 is not used, a sink mark forms at the interface 78 between the outer wall 52 and the polymeric pin 62.

The polymeric pin 62 is preferably made of a material which is compatible with that of the outer wall. The term "compatible", for the present invention, means a polymer that fuses with the polymeric material of outer layer 52 to form a continuous homogeneous seal at interface 78.

Figure 7:
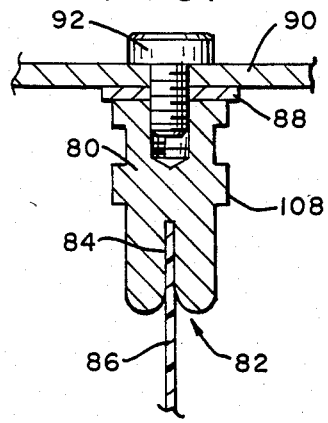
FIG. 7 is a sectional, schematic view of a slotted metal pin plus washer assembly securing a baffle in the mold prior to molding.
Figure 8:
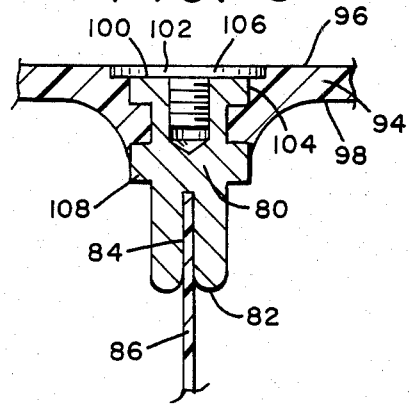
FIG. 8 is a schematic, sectional view of a metal pin of the embodiment shown in FIG. 7 slidably holding a baffle within an enclosed article and sealingly connected to the wall of the article. The washer has been replaced by a polymeric plug compatible with the polymeric wall of the article.

FIGS. 7 and 8 illustrate another embodiment of the present invention. In this embodiment slotted pins similar to the polymeric pins used in the embodiment illustrated in FIGS. 4, 5, and 6 are used. However, instead of using polymeric pins compatible with the outer wall, metal slotted pins are used. FIG. 7 shows a metal slotted pin 80 having a slotted end 82 containing a slot 84 in which baffle 86 is secured. In this embodiment, in order to prevent the metal slotted pin 80 from passing through the wall and the outside surface of the molded article, a washer 88 is inserted and located between the metal pin 80 and the mold 90. The slotted pin and washer assembly can be secured to the mold by a suitable means corresponding to that used in the embodiment shown in FIGS. 4, 5, and 6. In the embodiment shown in FIG. 7, a screw 92 is used to secure the assembly to the mold during molding.

Upon molding the article within mold 90, outer wall 94 is formed. The outer wall has an outside surface 96 and an inside surface 98. Upon removal of the hollow, enclosed article from the mold and removal of screw 92 and washer 88, the top 100 of metal pin 80 is exposed in a hole 102 where the washer was located. At this point the hollow, enclosed article has a boundary 104 between outer wall 94 and metal pin 80. It is this boundary which the process and article of the present invention seek to avoid. By using washer 88, washer hole 102 is located at the top 102 of slotted pin 80. The hole 102 can be sealed by any suitable means to prevent fluid leakage into or out of the article at the location of the pin. This hole can be filled with plug 106 which is preferably made of a material compatible with that in the outer wall. The plug is inserted and fused to the outer wall to form a seal that is continuous with the shape of the outer wall and fused so that there is no boundary apparent through which the contents, such as a fluid in the hollow, enclosed article can leak. Alternatively, the plug can be threaded into the outer wall 94. A sealant can be applied between the plug thread and the corresponding wall threads. A preferred sealant is a solution of a polymer material compatible with the plug and outer wall materials.

In the embodiment shown in FIGS. 7 and 8, the slotted pin has a circumferential flange 108. This circumferential flange, or any other suitable irregular shapes, can be used to provide a mechanical interlock between the outer wall and the means to secure the baffle to the outer wall.

The baffle used in the hollow, enclosed, seamless article of the present invention is a wall secured within the article. The wall divides the inside of the article into chambers. Preferably, there are openings in the baffle or between the baffle and the inside surface of the article to permit fluid within the article to communicate between the chambers inside the article. The baffle is preferably planar but can be nonplanar. The baffle can be made of any suitable material. Useful materials include metals such as galvanized steel sheet and aluminum sheet, and polymers which can withstand the molding process. Aluminum baffles are preferred.

The polymeric inner layer is preferably a polyamide. The term "polyamide" used in the practice of the present invention is intended to include long chain synthetic polymers which have regularly recurring amide groups as an integral part of the main polymer chain; and hence, include amide-ester copolymers. Suitable polyamides can be prepared by polymerization of a difunctional monomer or equivalently, its cyclized lactam (e.g., epsilon-aminocaproic acid or caprolactam, respectively) or by the reaction of a conjugate pair of monomers, for example, a diamide and a dicarboxylic acid (e.g., hexamethylenediamine and adipic acid), or a linear aminoaliphatic acid such as epsilon-amino undecanoic acid.

Suitable polylactams can be produced by the polymerization of lactam monomers of the formula

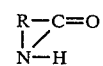

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryl lactam, etc. Also included are copolymers of two or more of the above or similar lactam monomers. Suitable diamines useful in the polymerization of polyamides include propanediamine, hexamethylenediamine, octamethylenediamine, etc. Suitable polycarboxylic acids include acids such as adipic acid, pimelic, suberic, sebacic, dodecaneoic, etc. Also included are copolymers or blends of polyamides of the above categories.

Typically, the number average molecular weight of these polymers is between about 10,000 and about 50,000, preferably 15,000 to 40,000 and more preferably 20,000 to 30,000. This is because mechanical properties improve rapidly until about 20,000, and processing starts to become more difficult above 30,000.

Polyepsiloncaprolactam is the preferred polyamide for use in the present invention. U.S. Ser. No. 256,887 filed Apr. 4, 1981 describing a preferred composition or process is hereby incorporated by reference. Polyepsiloncaprolactam suitable for use herein can contain a variety of terminal functionality. Preferred terminal functionality is that containing:

(a) A carboxyl group attached to both ends of the polyamide chain;

(b) A carboxyl group attached to one end and an acetamide group attached to the other end of the polyamide chain;

(c) An amine group attached to both ends of the polyamide chain; and (d) A carboxyl group attached to one end and an amino group attached to the other end of the polyamide chain. It is preferred that the polyepsiloncaprolactam have more chain ends terminated by acid groups than by amine groups. When this is the case, the composition can be rotationally molded in the presence of oxygen. However, it is preferred to use an inert, oxygen-free atmosphere, such as nitrogen or carbon dioxide, to prevent oxidation even where there are excess end groups terminated with carboxyl groups. If there are not more polyepsiloncaprolactam chain ends terminated with acid groups than with amine groups, an inert atmosphere is required for a satisfactory product with the polyepsiloncaprolactam stabilized by a stabilizer such as copper based compound, preferably cuprous iodide.

Polyamides other than polyepsiloncaprolactam can be used, but polyepsiloncaprolactam is preferred. For example, polyhexamethyleneadipamide has a higher melting temperature and flows with more difficulty than polyepsiloncaprolactam. The polyepsiloncaprolactam provides a lower melting, easier processing product wherein the pellets of material flow or knit more readily into each other.

The polyepsiloncaprolactam composition of this invention does not require the use of a plasticizer for successful rotational molding, although caprolactam can be used as a plasticizer.

In the process of the present invention after the means to sealingly connect the baffle and the baffle are secured to the inner mold wall, the hollow enclosed seamless polymeric article of the present invention is molded, preferably by rotational molding. The molding process forms the outer wall polymeric layer adjacent to the mold wall and the interface of the means to sealingly connect the baffle and the mold wall. When means to sealingly connect such as slotted polymer rods or pins are used the inside of the article is sealed from the outside at the location of the rods or pins. Where the means to sealingly connect is not polymeric, such as the washer and metal pin assembly, the means to sealingly connect the baffle requires the further step of sealing by connecting it. This can be accomplished by removing the washer from the outer wall and replacing it with a polymeric plug sealingly fused to the outer wall as discussed above. In this embodiment, at least part of the means, i.e., the plugs are made of a polymeric material compatible with the outer wall.

During the rotational molding process, the composition is heated to from about 121° C. (250° F.) to about 399° C. (750° F.), and preferably from 280° C. (550° F.) to 352° C. (675° F.). If the temperature is too high, optimum molding properties are not attained.

The rotational molding process with the above described composition comprises the steps of preparing a composition of the polymer, preferably polyamide and more preferably polycaprolactam. The composition is preferably in pellet form. This composition is fed into the rotational mold. The composition is heated within the mold as it is rotated. Generally, the rotational mold rotates simultaneously along two perpendicular axes. The mold is heated until the pellets within the mold melt and flow together on the inside surface of the mold. The mold is then cooled and the molded article is removed.

The polymer composition for rotational molding can be fed into the mold in powder or pellet form. If polycaprolactam is used and the particles are too small, their surface area is so large that exposure to the atmosphere results in excessive moisture pickup. For example, a 35 mesh size polycaprolactam powder exposed to the atmosphere is unsatisfactory unless it is kept dry. It is preferred to use pellets which are not as sensitive to moisture pickup. If the polycaprolactam particles are too large, it takes a longer time for them to melt and thinner parts cannot be made. Pellets can be from about 1/32 by 1/32 inch (0.079 cm×0.079 cm) (or about 1/32 inch (0.079 cm) average diameter) to about ⅛ by ⅛ inch (0.318 cm×0.318 cm) (or about ⅛ inch average diameter). A preferred pellet shape is a cylindrical pellet from about 1/32 to 1/16 inch (0.79 cm to 0.159 cm) in diameter, by about 1/16 (0.159 cm) to ⅛ inch (0.318 cm) long.

The polycaprolactam can be processed in most commercial rotational molding machines. The temperatures range during the heating step from about 288° C. (550° F.) to about 399° C. (750° F.), and preferably from about 302° C. (575° F.) to about 352° C. (675° F.). If the temperature is too high during rotational molding, the impact properties deteriorate. The temperature must be high enough for the pellets to fuse together to form a smooth inner surface of the molded article. The mold is heated by suitable means known in the art. Generally, the mold rotates within a forced air circulating oven.

After the heating step the mold is cooled. The part must be cool enough to be easily removed from the mold and retain its shape. Preferably, the mold is removed from the oven while continuing to rotate. Cool air is first blown on the mold. The air can be at ambient temperature. After the air has started to cool the mold for a controlled time period, a water spray can be used. The water cools the mold more rapidly. The water used can be at cold water tap temperature, usually from about 4° C. (40° F.) to about 16° C. (60° F.). After the water cooling step, another air cooling step may optionally be used. This is usually a short step during which the equipment dries with heat removed during the evaporation of the water.

The heating and cooling cycle times will depend on the equipment used and the article molded. Specific factors include the part thickness and mold material. Typical conditions for a ⅛ inch (0.318 cm) thick polycaprolactam molding in a steel mold are to heat the part in an oven with air at about 343° C. (650° F.) for about 19 minutes. The part is cooled in ambient temperature forced air for about 5 minutes and then in a tap water spray at about 10° C. (50° F.) for about 5 minutes. Optionally, the part is cooled in ambient temperature forced air for an additional 2 minutes.

During the heating and cooling steps, the mold containing the molded article is continually rotated along two perpendicular axes. The rate of rotation of the mold about each axis is limited by machine capability and the shape of the article being molded. A typical range of operation which can be used with the present invention is to have a rotation ratio of the major axis to the minor axis of from 1:2 to 1:10, and 2:1 to 10:1.

Preferably, the rotational molding is conducted under an inert atmosphere within the mold. However, this is not necessary, although it is preferred when using the preferred composition containing polyepsiloncaprolactam having an excess of chain ends terminated by a dicarboxylic acid group. When it is desired to use an inert atmosphere, the mold cavity can be purged with nitrogen. Most rotational molding machines have arms which are drilled for gas injection, so that all that is necessary is to connect a nitrogen gas cylinder to the arm, using the rotary valves in the connection. Alternatively, dry ice can be added to the mold cavity at the time the resin is charged to the mold. The dry ice will sublime during the heating cycle and provide an inert atmosphere.

The mold surface can be sprayed or coated with a mold release coating. A preferred mold release agent is a baked-on silicon based mold release coating, such as Freekote ®. This coating is baked for 15-20 minutes at about 282° C. (450° F.) to 343° C. (550° F.). The mold is cooled and sanded on the inside. The sanded surface allows the composition to maintain contact during molding and not release to readily and warp while being cooled. Yet upon cooling, the molded article easily releases. A vent can be used to avoid pressure buildup on the inside of the mold during the heating step.

Several examples are set forth to illustrate the nature of the invention and the manner of carrying it out. However, the invention should not be considered as being limited to the details thereof.

EXAMPLE 1

This example illustrates a slotted rod that is useful as a means to sealingly connect the baffle to the outer wall of an article. The slotted rods were made of polyhexamethyleneadipamide (Nylon 66). The rod was cylindrical having a diameter of ½ inch and a length of 8 inches. The slot was ¼ inch deep and 0.05 inches wide. The ends of the rods were rounded to hemispheical shapes having a diameter of ½ inch. The rods were made for use in a mold having rod seats to seat the rods when assembled with a baffle. The mold had two rod seats in opposite walls and is described in Example 6 below. The rod seats had a cross-sectional shape of a semicircle having a ½-inch radius. The baffle to be used was 12 inches × 14 ⅞ inches made of 0.05 inch thick aluminum. The means to connect would connect opposite 14 ⅞ inch sides.

EXAMPLE 2

Example 1 was repeated except that the rods were 2 inches long. More than one rod 2 inches long could be fitted along each 14 ⅞ inch edge of the baffle.

EXAMPLE 3

Example 1 was repeated except that the rod had a diameter of 1 inch and was made of polycaprolactam (Nylon 6). This was particularly useful when the molding polymer was also polycaprolactam. As with the rod in Example 1, one rod could be used on each edge of the baffle parallel to each rod seat.

EXAMPLE 4

A pin was made of polycaprolactam. The pin was of the type shown in FIG. 5. The pin was 1.5 inches long and generally cylindrical with a diameter of 1.0 inches. The slotted end contained a slot ½ inch deep and 0.05 inches wide. The secured end contained a threaded hole axially centered having a ¼-20 inch thread. The threaded hole was 0.5 inches deep. The secured end had a beveled edge. The diameter at the top of the secured end was 0.62 inches and the bevel extended axially 0.37 inches fanning out to the 1-inch diameter of the pin. The pins are disposed in opposite walls of the baffle with the slots coplanar to hold the planar baffle in place.

EXAMPLE 5

An aluminum pin of the type shown in FIG. 7 was constructed. The pin was 1.5 inches long and contained a slot 0.5 inches long and 0.05 inches wide. The pin had a circumferential flange beginning 0.75 inches from the slotted end and extending axially 0.25 inches. The flange had a diameter of 0.75 inches. The pin diameter was 0.6 inches. The pin had a top cap, extending axially 0.25 inches from the top having a diameter of 0.75 inches. There is a threaded hole in the top of the pin to receive a screw having a ¼-20 inch thread. The threaded hole is ½ inch deep. This pin is used in the same type of mold with the same baffle as Example 4.

This pin is used in conjunction with a washer having a diameter of 1.00 inches and being 0.20 inches deep. The washer has a 0.26-inch hole. The washer is assembled with the pin in the mold as shown in FIG. 8. Upon molding of the hollow, enclosed article, the box as discussed in Example 4, the screw is removed, the molded article removed from the mold, and the washer removed from the molded article. The washer is replaced by a 1.00 diameter by 3/16 inch high polycaprolactam disc. The pins are disposed in opposite walls of the baffle with the slots coplanar to hold the planar baffle in place.

EXAMPLE 6

A mold was made to mold rectangular, solid tanks 12 inches deep, 22 inches long and 17 inches wide. Rod seats having 0.5 inches radii were formed into opposite 22 inch by 12 inch deep walls 6 inches from end and coplanar. The rod seats were perpendicular to the 17-inch by 22-inch ends. Pinholes 9/16 inches in diameter were formed in the same walls as the rod seats 6 inches from the end opposite the end nearest the rod seats. The pinholes were coplanar in a plane parallel to the 12-inch by 17-inch walls. There were two pinholes in each 22 inch by 12 inch deep wall. The pinholes in each wall were six inches apart and 3 inches from the top and bottom. The tank mold had a flat cover which could be securely connected to the top of the mold during molding. The baffle was 12 inches high and 14 ⅞ inches long on one side, tapering down to the opposite side at an angle of 1½°. The corners of the baffle were cut off on a 45° angle to the sides. The corners were cut at 2 inches along each side from each corner. One baffle was made of 20 gauge (0.036 inch) thick galvanized steel. A second baffle was made of aluminum and was 0.05 inches thick.

The galvanized steel baffle was secured in place by two eight inch polycaprolactam rods of the type described in Example 3. The rods secured the 14 ⅞ inch long edges of the baffle into the rod seats in the opposite 12 inch by 22 inch walls of the mold. The rods were placed on the baffles and the assembly placed in the mold. Slit nylon tubing having an outside diameter of ¼ inch was placed over the baffle edges not secured, i.e., the 12-inch edges. This protected the outer wall adjacent to these exposed edges.

After the baffle was secured, 18 pounds of polycaprolactam (Nylon 6) was added to the mold. Because the baffle was off-center, about 11 lbs. of the resin which was pelletized to about 1/16 inch×⅛ inch long cylinders was added to the side of the baffle having a chamber with the larger volume and about 7 lbs. was put into the smaller chamber. A nitrogen atmosphere was introduced into the mold. The mold was heated for 30 minutes at 650° F. while being rotated about two axes. The mold was rotated at 6 rpm about its major axis with a rotation ratio of 4:1. After 30 minutes the mold was removed from the oven while rotating and cooled in air at room temperature for 7 minutes followed by rotation in cooling tap water at about 50° F. for 7 minutes and finally in drying air for 2 minutes. The molded tank containing the baffle released satisfactorily, retaining its shape. The tank was a hollow, enclosed, seamless polymeric box containing a baffle sealed within.

EXAMPLE 7

A tank was molded using the same mold and the galvanized steel baffle described in Example 6. The baffle was secured in place using the ½ inch diameter nylon 6/6 rods described in Example 1. As in Example 6, slit nylon tubes covered the non-secured baffle edges.

After the baffle was secured in place, 14 pounds of polycaprolactam (Nylon 6) was added to the mold. Because the baffle was off-center, about 8.5 lbs. of the resin which was pelletized to about 1/16 inch×⅛ inch long cylinders was added to the chamber on the side of the baffle having the larger volume and about 5.5 lbs. was put into the smaller chamber. A nitrogen atmosphere was introduced into the mold. The mold was heated for 28 minutes at 650° F. while being rotated about two axes. The mold was rotated at 6 rpm about its major axis with a rotation ratio of 4:1. After 28 minutes the mold was removed from the oven while rotating and cooled in air at room temperature for 10 minutes followed by rotation in cooling tap water at about 50° F. for 10 minutes and finally in drying air for 2 minutes. The molded tank containing the baffle released satisfactorily, retaining its shape. The tank was a hollow, enclosed, seamless polymeric box containing a baffle sealed within.

EXAMPLE 8

Example 7 was repeated except that the means to secure were the aluminum pins described in Example 5. Two pins were secured in each pinhole of each side of the tank having pinholes as described in Example 6. The pins were secured by ceramic screws having a ¼-20 thread. There was a 1.0 inch diameter by 0.020 inches thick washer as described in Example 5 between the inside surface of the mold wall and the pin. After the tank was molded and removed from the mold, the washer was replaced by a 1.00 inch diameter by 3/16 inch thick polycaprolactam disc sealingly fused into place. The tank thereby contained a baffle sealed inside.

EXAMPLE 9

Example 7 was repeated except that the means to secure the baffle were the polycaprolactam pins described in Example 4. The pins were secured in the pinholes by ceramic screws having a ¼-20 thread. The resulting tank molded and released well and contained a baffle sealed inside. The polycaprolactam pins sealingly fused to the molded outer wall of polycaprolactam.

In all of the Examples, tanks containing the baffle were rotationally molded with means to secure the baffle selected from those described in Examples 1 through 5. The rotationally molded tanks formed well and the inside of the cube was satisfactorily sealed from the outside of the cube at the location of the means to secure the baffle to the outer wall.

While exemplary embodiments of the invention have been described, the true scope of the invention is to be determined from the following claims.

What is claimed is:

1. A hollow, enclosed, seamless polymeric article comprising:
   an outer wall having an outside surface and an inside surface;
   at least one baffle; and
   a rod containing a longitudinal slot to receive the baffle, wherein the rod is made of a polymeric material compatible with the polymeric material of the outer wall, the rod being connected to the inner surface of the outer wall and connecting the baffle to the outer wall inside of the article.

2. The article as recited in claim 1 wherein the rod is an elongated cylinder, the outer wall has at least one flat surface, and the at least one flat surface has a groove in which the rod sits.

3. A hollow, enclosed, seamless polymeric article comprising:
   an outer wall having an outside surface and an inside surface;
   at least one baffle; and
   at least one pin slotted to receive the baffle, the slotted pin being made of a polymeric material compatible with the polymeric material of the outer wall and fused to the outer wall to sealingly connect the baffle to the outer wall.

4. The article as recited in claim 3 wherein the slotted pin has a beveled outer wall contact surface.

5. The article as recited in claim 3 wherein the slotted pin further comprises a circumferential flange.

6. A hollow, enclosed, seamless polymeric article comprising:
   an outer wall having at least one flat surface having a groove and an inside surface;
   at least one baffle; and a rod containing a longitudinal slot to receive the baffle, wherein the rod is an elongated cylinder made of a polymeric material compatible with the polymeric material of the outer wall, the rod sitting in the groove and being connected to the inner surface of the outer wall and connecting the baffle to the outer wall inside of the article.

7. The article as recited in claim 6 wherein there are at least two flat surface portions along the outer wall; and at least two flat surface portions have a semicircular groove, there being a rod seated in the groove of at least two portions with the slot of each rod in the groove of at least two portions being coplanar to receive the baffle.

8. A hollow, enclosed, seamless polymeric article comprising:
 an outer wall having an outside surface and an inside surface;
 at least one baffle;
 at least one pin slotted to receive the baffle, the slotted pin having an outer wall contact surface, the outer wall contact surfact being beveled, the slotted pin being molded into the outer wall through the inner surface of the outer wall; and
 a sealing plug sealed to the outside surface of the outer wall and between the outer wall and slotted pin.

9. The article as recited in claim 8 wherein the slotted pin further comprises a circumferential flange.

10. A hollow, enclosed, seamless polymeric article comprising;
 an outer wall having an outside surface and an inside surface;
 at least one baffle; and
 at least one pin slotted to receive the baffle, the slotted pin having an outer wall contact surface, the outer wall contact surface being beveled, and the slotted pin being made of a polymeric material compatible with the polymeric material of the outer wall and fused to the outer wall.

11. The article as recited in claim 10 wherein the slotted pin further comprises a circumferential flange.

* * * * *

UNITED STATES PATENT AND TRADEMARK OFFICE
CERTIFICATE OF CORRECTION

PATENT NO. : 4,517,231

DATED : May 14, 1985

INVENTOR(S) : J.R. May, F. Petruccelli, R. L. Lang & H. P. de Haan

It is certified that error appears in the above-identified patent and that said Letters Patent are hereby corrected as shown below:

Col. 12, line 43, "connected" should read -- fused --.

Signed and Sealed this

Twenty-seventh Day of August 1985

[SEAL]

Attest:

DONALD J. QUIGG

Attesting Officer     Acting Commissioner of Patents and Trademarks